US008813242B1

(12) United States Patent
Ginevan (10) Patent No.: US 8,813,242 B1
(45) Date of Patent: Aug. 19, 2014

(54) AUTO-INSERTION OF INFORMATION CLASSIFICATION (71) Applicant: Mobile Iron, Inc., Mountain View, CA (US)

(72) Inventor: Sean Michael Ginevan, San Francisco, CA (US)

(73) Assignee: Mobile Iron, Inc., Mountain View, CA (US)

( * ) Notice: Subject to any disclaimer, the term of this patent is extended or adjusted under 35 U.S.C. 154(b) by 0 days.

(21) Appl. No.: 14/189,773

(22) Filed: Feb. 25, 2014

Related U.S. Application Data (60) Provisional application No. 61/768,632, filed on Feb. 25, 2013.

(51) Int. Cl.
*H04L 29/06* (2006.01)
*H04L 29/08* (2006.01)
*H04L 12/58* (2006.01)
*H04L 12/24* (2006.01)

(52) U.S. Cl.
CPC ............ *H04L 67/2823* (2013.01); *H04L 63/04* (2013.01); *H04L 51/063* (2013.01); *H04L 41/0266* (2013.01); *H04L 41/5093* (2013.01)
USPC .......................................... 726/26; 709/204

(58) Field of Classification Search
CPC ... H04L 67/2823; H04L 63/04; H04L 51/063; H04L 41/0266; H04L 41/5093
USPC .......................................... 726/26; 709/204
See application file for complete search history.

(56) References Cited

U.S. PATENT DOCUMENTS

| 5,659,686 | A | * | 8/1997 | Hou | 709/238 |
| 5,995,726 | A | * | 11/1999 | Dillon | 709/231 |
| 2009/0138972 | A1 | * | 5/2009 | Scales | 726/24 |
| 2009/0148048 | A1 | * | 6/2009 | Hosomi | 382/190 |
| 2010/0100371 | A1 | * | 4/2010 | Yuezhong et al. | 704/9 |
| 2010/0154063 | A1 | * | 6/2010 | Hutton et al. | 726/24 |
| 2013/0031454 | A1 | * | 1/2013 | Griffiths et al. | 715/230 |

OTHER PUBLICATIONS

TITUS, Message Classification Software—TITUS, User Driven Classification for Email, Feb. 17, 2013, retrieved from http://web.archive.org/web/20130217205703/http://www.titus.com/software/message-classification/index.php?

* cited by examiner

*Primary Examiner* — Michael S McNally
(74) *Attorney, Agent, or Firm* — Van Pelt, Yi & James LLP (57) ABSTRACT

Automatic classification of mobile device-originated content is disclosed. A content object sent from a mobile application to a destination may be received at an intermediate node. The content object may be processed to identify one or more control characters included in the content object. The content object may be modified to replace the identified control characters with classification information.

27 Claims, 6 Drawing Sheets

FIG. 6

US 8,813,242 B1

AUTO-INSERTION OF INFORMATION CLASSIFICATION

CROSS REFERENCE TO OTHER APPLICATIONS

This application claims priority to U.S. Provisional Patent Application No. 61/768,632 entitled AUTO-INSERTION OF INFORMATION CLASSIFICATION filed Feb. 25, 2013 which is incorporated herein by reference for all purposes.

BACKGROUND OF THE INVENTION

Emails, documents, and/or other types of content may include classification information. For example, certain enterprises (e.g., highly-regulated enterprises, enterprises that deal with sensitive information, government agencies, etc.) may be required to classify communications (e.g., emails), documents, and/or other content. Content may be classified as, for example, internal (e.g., "For Internal Use Only"), external, privileged, confidential, top secret, and/or any other type of classification. Typically, a desktop plugin may add a plain text classification type (e.g., "Attorney-Client Privileged") to the beginning of a content object (e.g., an email), and in certain cases may add metadata information (e.g., to an email message header) that defines the classification. Enterprises may seek to provide automatic document classification for content sent from a mobile device.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Automatic classification of mobile device-originated content is disclosed. In various embodiments, a content object sent from a mobile application to a destination may be received at an intermediate node. The content object may be processed to identify one or more control characters included in the content object. The content object may be modified to replace the identified control characters with classification information. In various embodiments, an intermediate node may include a server, mobile application (e.g., a classification application), and/or other node (e.g., intermediate node) that modifies the content object to include classification information. For example, the intermediate node may insert classification-related text into content included in the content object, add classification metadata to the content object, and/or otherwise cause classification information to be associated with the content object. The intermediate node may provide the modified content object to the destination.

Figure 1:
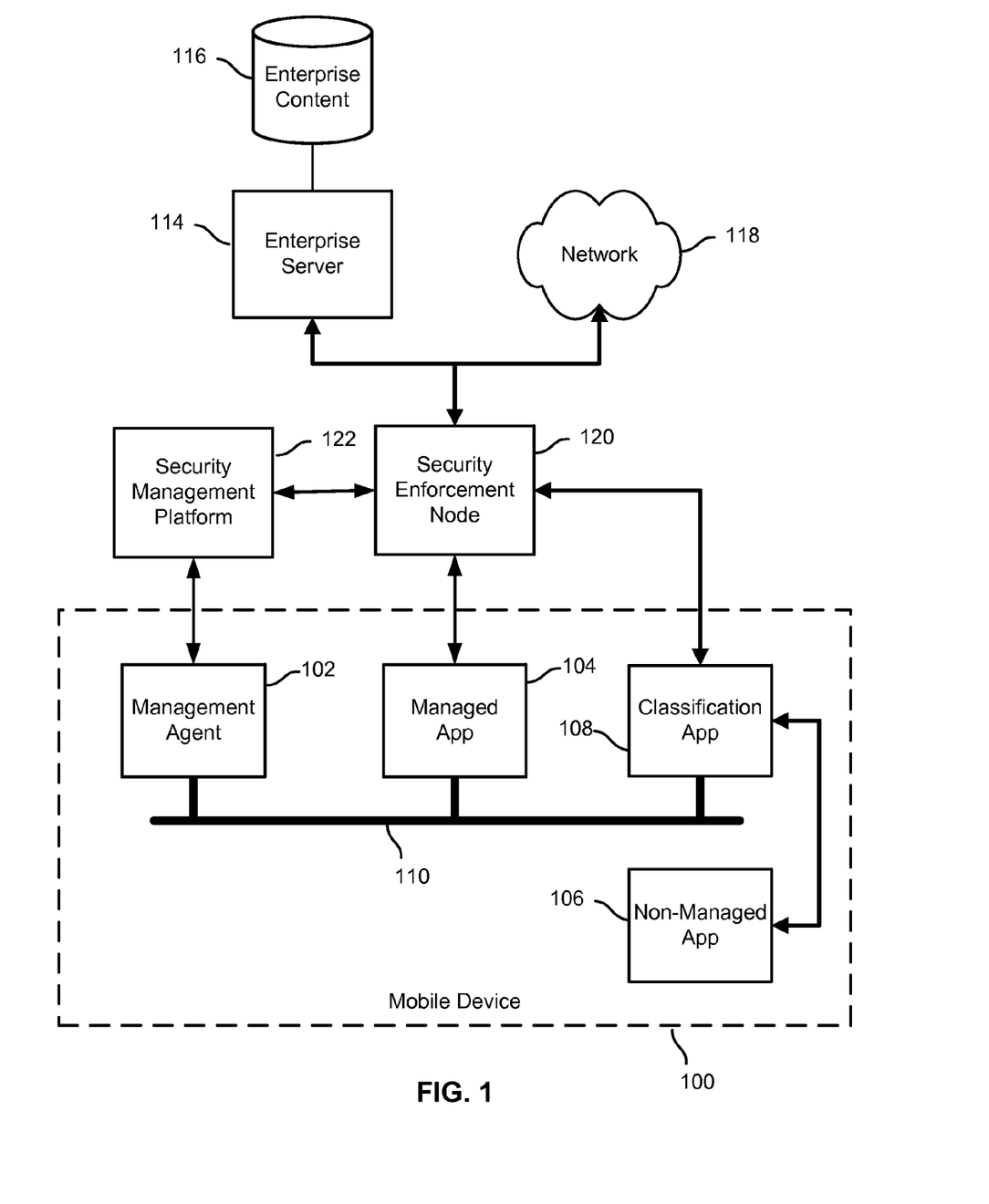
FIG. 1 is a block diagram illustrating an embodiment of a system to automatically classify content.

FIG. 1 is a block diagram illustrating an embodiment of a system to automatically classify content. In the example shown, a mobile device 100 (e.g., smartphone, tablet, etc.) includes a management agent 102 (e.g., a mobile device management (MDM) agent, a trusted management agent, trust client app), managed applications 104 (e.g., enterprise applications, managed client applications), non-managed applications 106 (e.g., personal applications, non-authorized applications, untrusted applications), classification applications 108, and/or other applications. In some embodiments, a classification application 108 may be a type of managed application 104.

The management agent 102, managed applications 104, classification application(s) 108, and/or other applications may be elements of an MDM system. The management agent 102, managed applications 104, classification application(s) 108, and/or other components may be configured to share information/data in a trusted manner via a secure mobile application connection bus 110 (e.g., secure inter-application connection bus, secure application command bus, etc.). In some embodiments, the secure mobile application connection bus 110 includes an encrypted data storage location (e.g., a paste board, shared keychain location, and/or other storage), which is accessible to the nodes authorized to communicate via the bus 110. In various embodiments, a secure mobile application connection bus 110 may include a technique in which uniform resource locator (URL) scheme-based calls are used to transfer encrypted data.

According to various embodiments, communications between the mobile device 100 and enterprise backend server(s) 114 (e.g., enterprise server, file servers, email server, hypertext markup language server, application server, SharePoint™ server, Exchange™ server, ActiveSync™ server, etc.), enterprise content 116 (e.g., files, enterprise data), networks 118 (e.g., an non-enterprise network, the Internet, a wide area network (WAN), cloud storage service(s), a non-enterprise email server(s), etc.), and/or other components may pass through a security enforcement node 120 (e.g., proxy server, sentry). In various embodiments, the security enforcement node 120 may be a reverse proxy for synchronization, data transfer, and/or other traffic between managed applications 104 and enterprise servers such as the backend server 114. For example, the security enforcement node 120 may terminate email traffic (e.g., ActiveSync™ traffic) from an email client to an enterprise email server (e.g., Active-Sync™ server) to, for example, inspect email content objects. The security enforcement node 120 may be configured to, for example, modify a body, header, and/or other portions of an email content object. In another example, the security enforcement node 120 may inspect, modify, and/or otherwise process other types of content objects (e.g., documents, files, images, audio files, video, etc.) passed from a mobile application 104 to a backend server 114 and/or network 118.

In various embodiments, a security management platform 122 (e.g., a virtual smartphone platform, security management server, etc.) manages classification information (e.g., control characters, classification-related text, classification metadata), classification polic(ies) (e.g., content classification policies), configuration(s) (e.g., application data configurations), and/or settings associated with the security enforcement node 102 and applications (e.g., managed applications 104, classification applications 108) on the mobile device 100. For example, the security management platform 122 may configure the security enforcement node 120, classification application(s) 108, and/or other nodes to perform the content classification techniques disclosed herein.

According to some embodiments, control characters (e.g., control character combinations), user attribute information, and/or other information and corresponding classification information may be defined by an administrator at the security management platform 122, a mobile device user, and/or other entity. For example, an administrator may enter information associating certain control characters (e.g., "%i%") with content classification information (e.g., "For internal use only"). In various embodiments, information associating the control characters, content classification information, and/or other information (e.g., user attribute information) may be stored in classification data structure (e.g., a table, list, database, tree, graph, and/or any other organized set of information). In various embodiments, the security management platform 122 may provide classification data structure(s) to the security enforcement node 120, classification application(s) 108, and/or other nodes for use in content classification operations as discussed herein.

In some embodiments, the security management platform 122 may provide classification data structure(s), classification policies, and/or other information to classification applications 108 and/or other nodes on the mobile device 100 using the management agent 102 as an intermediary. For example, information and/or commands intended for the classification application 108 may be pushed to the management agent 102 for secure distribution to the classification application 108. In some embodiments, the management agent 102 may, for example, connect to the security management platform 122 (e.g., on a periodic basis) to update the device 100 status, retrieve classification data structure(s), retrieve classification policy information, and/or perform other operations.

Figure 2:
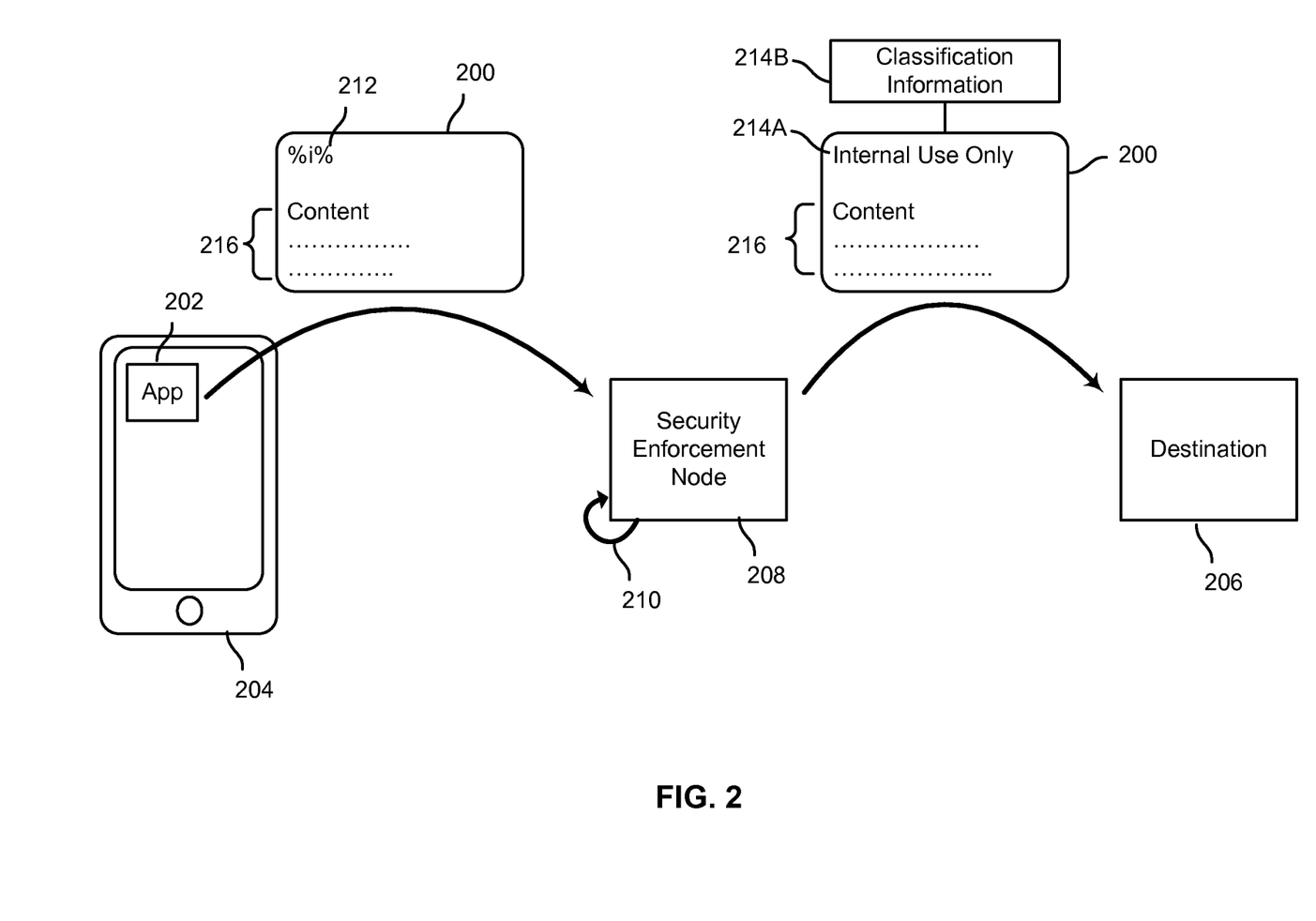
FIG. 2 is a block diagram illustrating an embodiment of content classification.

FIG. 2 is a block diagram illustrating an embodiment of content classification. In the example shown, a content object 200 (e.g., an email, document, file, data, etc.) may be sent (e.g., transferred, transmitted) from a mobile application 202 on a mobile device 204 to a destination 206 (e.g., enterprise server 114 of FIG. 1, network 118 of FIG. 1, and/or another destination). A security enforcement node 208 (e.g., an intermediate destination) may receive the content object 200 sent from the mobile application 202 to the destination 206. The security enforcement node 208 may process (210) the content object to identify control characters 212 (e.g., "%i%", "*confidential*"), user attribute information (e.g., an identity of the sender and/or recipient), and/or other information associated with the content object 200. The security enforcement node 208 may, based at least in part on the identified control characters 212, modify (210) the content object 200 to replace the control characters 212 with classification information 214A, 214B. For example, the control characters 212 may be removed and/or classification information 214A, 214B may be inserted in, attached to, appended to, and/or otherwise associated with the content object 200. In various embodiments, classification information may include, for example, classification-related text 214A (e.g., "Internal Use Only"), images (e.g., a watermark), and/or other data inserted into the content included in a content object 200. In some embodiments, classification information 214B may include, for example, classification metadata, tags, email header information, and/or other classification information associated with the content object 200. The security enforcement node 208 may provide the modified content object 200 (e.g., including classification information 214A, 214B) to the destination 206.

Figure 3:
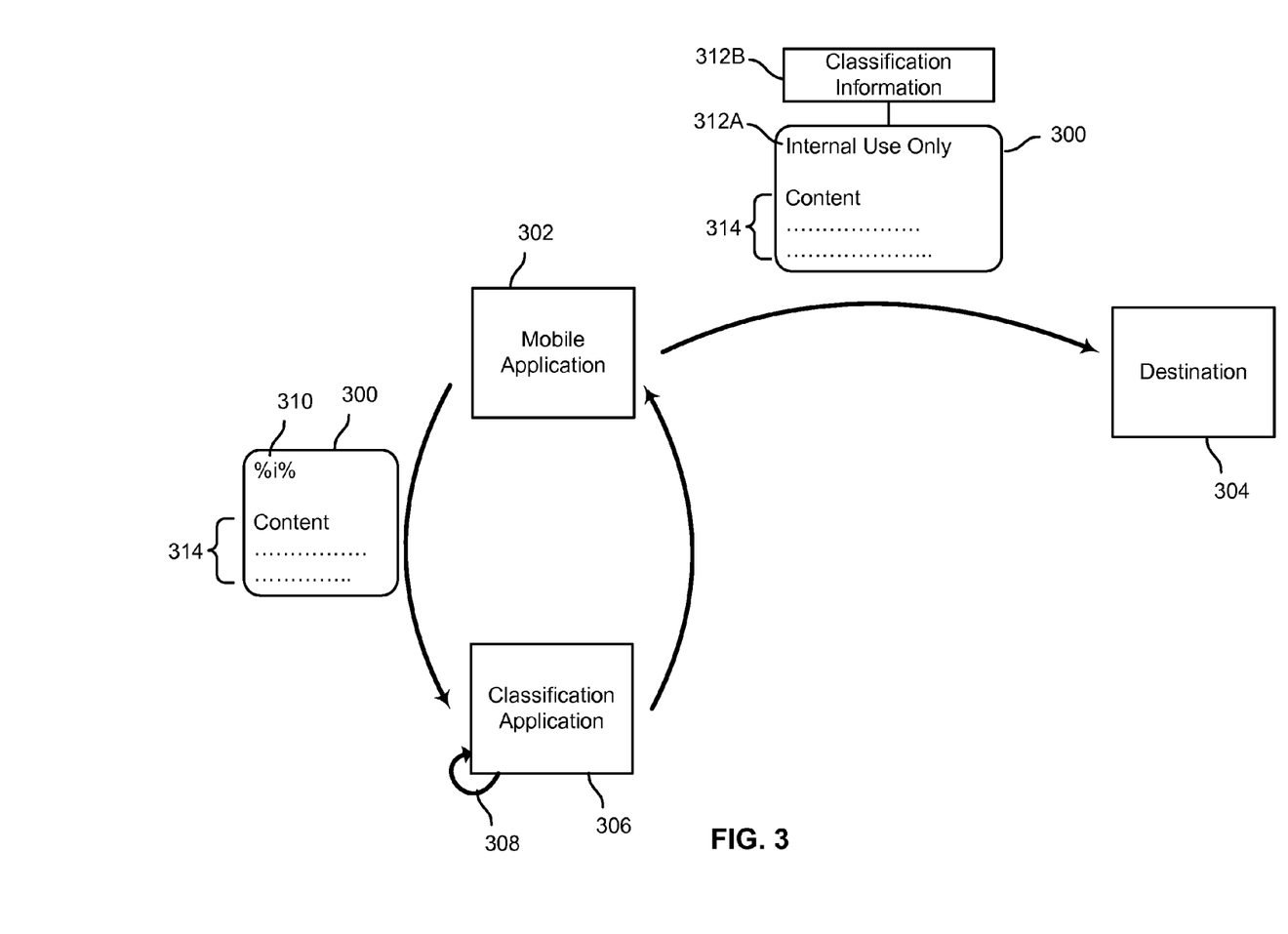
FIG. 3 is a block diagram illustrating an embodiment of content classification.

FIG. 3 is a block diagram illustrating an embodiment of content classification. In the example shown, a content object 300 may be sent from a mobile application 302 on a mobile device to a destination 304. In some embodiments, a classification application 306 (e.g., an intermediate destination) may receive (e.g., intercept, hook) the content object 300 sent from the mobile application 302 to the destination 304. The classification application 306 may, for example, be associated with the mobile application 302. For example, the mobile application 302 (e.g., an email application) may be configured to call the classification application 306 with the content object 300 (e.g., email content) upon, for example, sending content object 300 to the destination 304. The classification application 306 may be called, for example, as a step in executing a send content command (e.g., send email command, document transfer command, etc.).

In various embodiments, the classification application 306 may process (308) the content object 300 to identify one or more control characters 310 included in the content object 300. The classification application 306 may modify (308) the content object 300 to replace any identified control characters 310 with classification information 312A, 312B. For example, the control characters 310 may be removed and/or classification information 312A, 312B may be inserted in, attached to, appended to, and/or otherwise associated with the content object 300.

In some embodiments, the classification application 306 may, based on the detected control characters, generate and output a prompt (e.g., to a user) requesting the user to select classification information 312A, 312B. Classification information 312A, 312B selected by the user may be, for example, inputted, attached to, and/or otherwise associated with the content object 300. For example, a prompt may be output requesting the user to select one or more classification types (e.g., "For Internal Use Only," "Classified," and "Top Secret") to be associated with the object. Based on the classification type(s) selected (e.g., by the user), classification-related text 312A may be inserted in the content 314, classification metadata 312B may be associated with the content object 300, and/or classification information 312B may be added to a header associated with the content object.

In some embodiments, the classification application 306 may provide to the modified content object 300 to the mobile application 302. The mobile application 302 may then provide the modified content object 300 to the destination 304, another intermediate node (e.g., a security enforcement node), and/or another node.

In various embodiments (not shown), the classification application 306 may provide the modified content object 300 (e.g., including classification information 312) to the destination 304.

Figure 4:
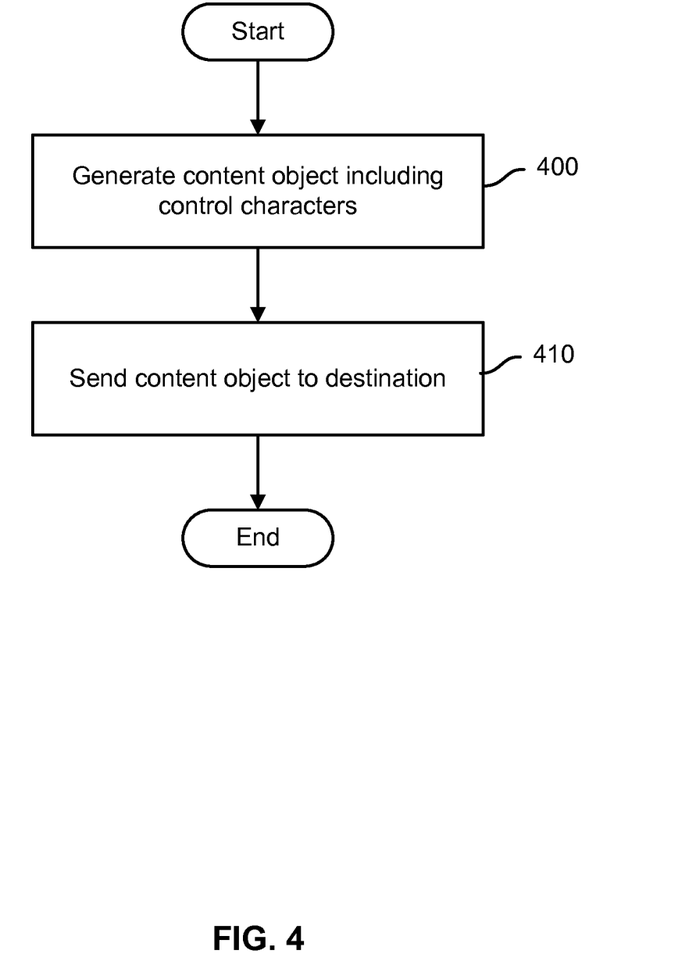
FIG. 4 is a flow chart illustrating an embodiment of a process of generating a content object.

FIG. 4 is a flow chart illustrating an embodiment of a process of generating a content object. In various embodiments, the process is performed by the system 100 of FIG. 1. At 400, a content object including one or more control characters may be generated. In various embodiments, a content object may include an email, a document (e.g., a text document, word processing documents, spreadsheet, webpage, email text, an image, and/or any document), video, file, folder, and/or any other data. In some embodiments, a content object is generated at a mobile application (e.g., an email client (e.g., an ActiveSync™ client), a data synchronization application, file sharing application, a managed web browser, an enterprise document viewer, gaming application, and/or any application). For example, an email content object may be generated at an email client, and the email content object may include one or more control characters (e.g., "%i%"). The user that generated the email content object may be aware that the control character "%i%" corresponds to (e.g., is shorthand for) a classification of "For internal use only." In another example, a document including one or more control characters (e.g., "%confidential%") may be generated at a file access application. The user who created the document may be aware that the control character "%confidential%" corresponds to a classification of "Confidential." In various embodiments, control characters may be included in a content object as a shorthand technique of adding classification information to the content object. For example, typing a few control characters on a mobile device keyboard may be easier than entering blocks of classification text and/or executing commands to add classification metadata information to a content object.

At 410, the content object may be sent to a destination. In some embodiments, a destination may include, for example, an enterprise backend server, enterprise content repository, a network destination, an email server, a file repository, and/or any other destination. In some embodiments, the content object may be sent from, for example, a mobile application to a destination. For example, an email content object may be sent to a destination (e.g., an email server) based on a send command, for example, executed in a context of an email client. In another example, a document content object may be sent to a document repository (e.g., an enterprise file repository, a cloud file storage location, etc.), for example, in response to a content transfer command (e.g., a drag and drop command) executed in a context of a mobile application (e.g., a file access application).

In some embodiments, sending the content object to a destination may include calling a classification application. The classification application may be associated with the mobile application from which the content object originated, associated with an MDM architecture in which the mobile application is included, and/or otherwise associated with the mobile application. For example, a classification application associated with a mobile application may be called at least in part in response to a send, content transfer, and/or other command executed in the mobile application. Based on the classification application call, the content object may be sent to the classification application for classification.

Figure 5:
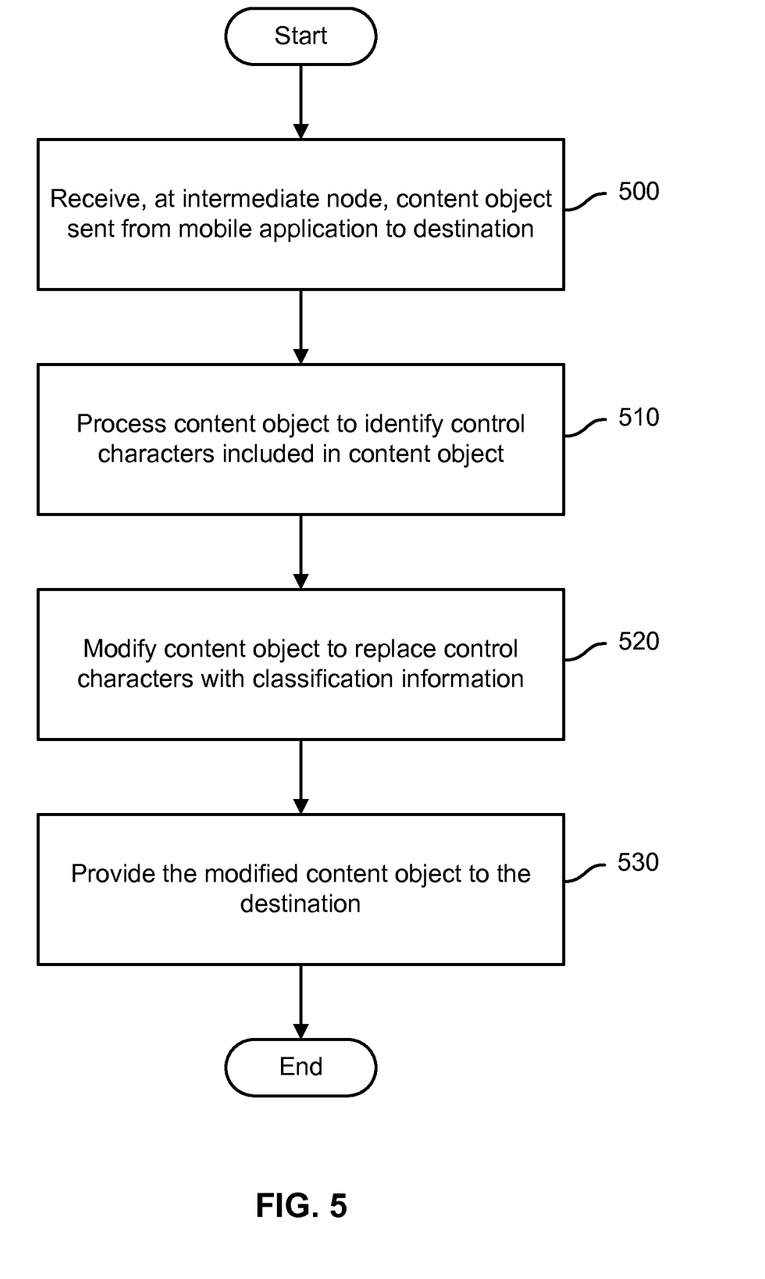
FIG. 5 is a flow chart illustrating an embodiment of a process of automatically classifying content.

FIG. 5 is a flow chart illustrating an embodiment of a process of automatically classifying content. In various embodiments, the process is performed by the system 100 of FIG. 1. At 500, a content object sent from a mobile application to a destination is received at an intermediate node. In various embodiments, an intermediate node may include a server (e.g., security enforcement node 120 of FIG. 1, proxy server, etc.), an application (e.g., classification application 108 of FIG. 1), and/or any other node.

At 510, the content object is processed to identify control characters included in the content object. In various embodiments, the content object may be parsed and/or otherwise processed to identify control characters. Control characters may include, for example, a set of characters (e.g., "%i%," "%confidential%," etc.) that the intermediate node will identify as being associated with classification information. For example, an email client end user may enter a control character (e.g., "%i%) in the body, subject line, header, and/or other portion of an email. The email may be processed (e.g., parsed) by, for example, the intermediate node, and the control character may be identified.

In some embodiments, at least a portion of a content object may be encrypted and/or otherwise protected at a mobile application. The encrypted content object may be sent to the destination and received at the intermediate node. In certain cases, the intermediate node may not be able to decipher the encrypted content. Portions of the content object may, however, be decipherable (e.g., unencrypted). In one example, content of an email (e.g., the body, recipient(s), and/or other information) may be encrypted while the header is not encrypted. In this case, control characters may be included in the header of the email, and the header-embedded control characters may be identified using the techniques disclosed herein.

In various embodiments, non-English control characters, images, symbols, and/or other characters may be identified. In one example, a mobile application used to generate a content object may be associated with a "non-English" keyboard. For example, the mobile device user may communicate in a language other than English. In some embodiments, to handle the case in which a user does not have the appropriate keyboard to enter the primary control character, the intermediate node may be configured to identify (e.g., recognize) alternative control characters, for example, selected from non-English character sets such as Chinese, Japanese, and/or other character sets. Ultimately, control characters may include characters from non-English alphabets, symbols, images, and/or any other type of content.

At 520, the content object may be modified to replace the control characters with classification information. In some embodiments, classification information may be determined based at least in part on the identified control characters. In various embodiments, an intermediate node may be associated with (e.g., include, have access to) a classification data structure including control characters, user attribute information, and/or corresponding classification information. The classification data structure may include information indicating a relationship (e.g., association) between control characters, user attributes, and/or classification information. For example, the relationship between control characters, user attributes, and/or classification may be indicated by virtue of the organization of the data in the classification data structure. The intermediate node may, for example, query the classification data structure based on the identified control characters to select (e.g., identify) classification information corresponding to the identified control characters.

In various embodiments, the control characters in the content object may be replaced by classification information. For example, the control characters may be removed, and classification information may be inserted in, appended to, and/or otherwise associated with the content object. In one example, control characters (e.g., "%e%") may be removed and classification-related text (e.g., "For external use") may be included in content (e.g., body text) of the content object in a location in which the control characters were located. In another example, classification-related text may be included in the content object at a location distinct from a location of the control characters (e.g., at any location in the content object).

By way of example, an email content object received at the intermediate node may include content, control characters (e.g., "%i%"), and/or other information including the following:

%i Lorem ipsum dolor sit amet, consectetur adipisicing elit, sed do eiusmod tempor incididunt ut labore et dolore magna aliqua.

Sent from my iPhone

In some embodiments, the email content object may be processed (e.g., parsed) to identify the control characters (e.g., "%i%"). The identified control characters may be used to determine (e.g., based on a query of a classification data structure) classification-related text (e.g., "For internal use only") corresponding to the control characters. At least a portion of the control characters in the body, header, and/or other portion of the email may be replaced with the classification-related text. An example of the modified email content object is as follows:

Classification: For internal use only

Lorem ipsum dolor sit amet, consectetur adipisicing elit, sed do eiusmod tempor incididunt ut labore et dolore magna aliqua.

Sent from my iPhone

In various embodiments, classification information (e.g., classification metadata) may be added to the email message header, attached to the email content, and/or otherwise associated with the email. For example, classification metadata designating the email content object "for internal use only" may be added to a header associated with the email content object.

At 530, the modified content object may be provided to the destination. In some embodiments, upon completion of the modification process, the content object may be provided to the destination intended by the user who sent the content object and/or by the mobile application from which the content object was sent. In various embodiments, the content object may be provided to the destination in such a manner that the user of the mobile application, the mobile application, and/or the destination is not aware that the content was modified at the intermediate node. For example, a security enforcement node may receive the content object, modify the content object, and/or provide the content object to the destination without providing any indication to a user of the mobile application.

In some embodiments, the intermediate node may be a classification application, and the modified content may be provided to the mobile application to send to the destination. The content object may, for example, have been received from the mobile application at the classification application, the content object may have been modified at the classification application, and the modified content object may be provided to (e.g., sent back to) the mobile application. The mobile application may then send the modified content object to the destination. In some embodiments, the classification application may send the content object to the destination (e.g., without returning the content object to the mobile application).

According to some embodiments, the modified content object may, for example, be received at the destination, and the classification information (e.g., classification metadata, classification-related text) may be used to process the content object. For example, the classification information included in the content object may be used at the destination to store the content object (e.g., in a specific storage location, folder, label, etc.), restrict distribution of the content object, filter the content object, label the content object, and/or perform other operations.

Figure 6:
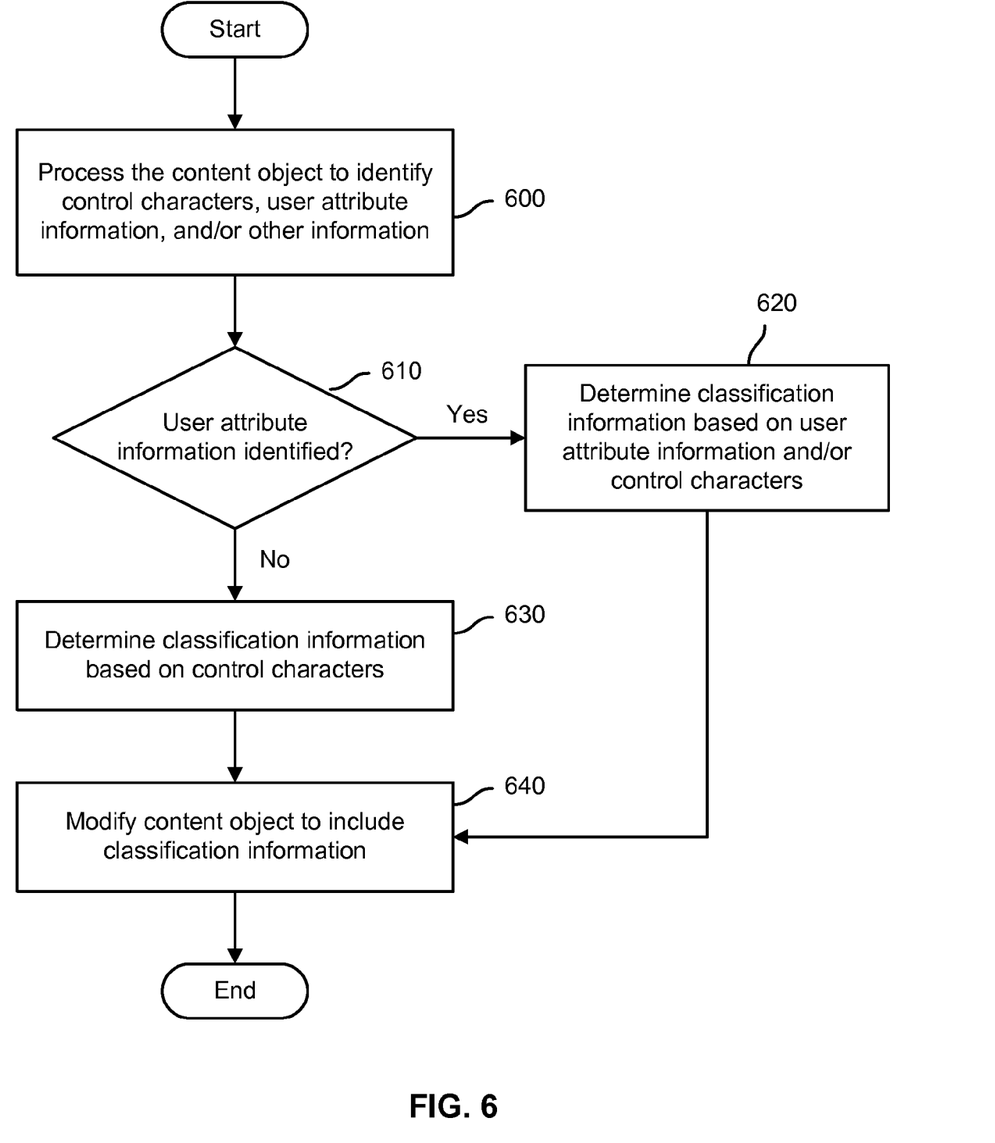
FIG. 6 is a flow chart illustrating an embodiment of a process of automatically classifying content.

FIG. 6 is a flow chart illustrating an embodiment of a process of automatically classifying content. In various embodiments, the process is performed by the system 100 of FIG. 6. At 600, the content object may be processed to identify one or more control characters, user attribute information, and/or other information. In some embodiments, a content object may be parsed. For example, content (e.g., text, data, images) included in the content object may be parsed and/or otherwise processed using any parsing technique known in the art. The content object may, for example, be parsed to identify any control characters and/or other classification-related information included in the content object.

In some embodiments, metadata, contextual data, and/or other information associated with the content object may be processed to identify user attribute information and/or other classification-related information associated with the content object. For example, metadata, header information, and/or other information associated with an email may include user attribute information identifying the sender of the email, recipient(s) of the email, mailbox(es) from which the email was sent, and/or other user attribute information.

At 610, it may be determined whether user attribute information is associated with the content object. In various embodiments, user attribute information may include any information associated with a user of the content object (e.g., author(s) of the content object, recipient(s) of the content object, user(s) with access to the content object, mobile applications associated with the content object, mobile devices associated with the content object, etc.). For example, an email content object received at the intermediate node may be processed to identify user attributes associated with the email content object. User attributes associated with the email content object may include, for example, information identifying a sender, attributes associated with a sender, a mailbox associated with the sender, recipient(s), recipient attributes, and/or other information associated with the email content object. In one example, user attributes may include language(s) in which the sender, recipients, and/or other part(ies) associated with the email content object communicate. In another example, user attributes may include the identity of the mailbox from which an email content object originated. In the event user attributes are associated with the content object, the process may proceed to step 620. In the event user attributes are not associated with the content object, the process may proceed to step 630.

At 620, classification information may be determined based at least in part on the identified user attributes and/or control characters. In various embodiments, an intermediate node may be associated with a classification data structure (e.g., table, database, array) including user attribute(s), control characters, classification information, and/or other information. For example, the classification data structure may include combinations of user attributes, control characters, classification information, and/or other information. An intermediate node may use the classification data structure to determine classification information based on the user attribute information, control characters, and/or other information identified in the content object.

In some embodiments, user attributes may include a language associated with a recipient of a content object. For example, a first content object recipient may be associated with a first language user attribute (e.g., German), and a second content object recipient may be associated with a second language user attribute (e.g., English). These language user attributes may be stored in a classification data structure. And the classification data structure may be used to determine that an email content object including the control characters "%i%" sent to the first recipient (e.g., a German-speaking recipient) should include German classification-related text (e.g., "Klassifizierung: Nur für internen Gebrauch") and/or associated classification metadata. Similarly, the classification data structure may be used to determine that email content objects including the control characters "%i%" sent to the second recipient (e.g., an English speaking recipient) should include English classification-related text (e.g., "Classification: For internal use only") and/or associated classification metadata.

In various embodiments, control characters, user attributes and their corresponding classification information may be defined (e.g., customizable) on a mobile application by mobile application basis. For example, control characters, user attribute information, and/or other information and corresponding classification information may be defined by an administrator at a mobile device management server (e.g., security management platform 122 of FIG. 1), a mobile device user, and/or other entity. For example, an email client user, administrator, and/or other user may assign certain control character combinations (e.g., "%p&c%") and/or user attributes (e.g., when sent to employees of Enterprise A) to corresponding classification information (e.g., "Privileged and Confidential"). And when an email content object sent to employee(s) of Enterprise A including the characters %p&c% is received at the intermediate node, the "%p&c%" control characters may be removed and replaced with "Privileged and Confidential."

According to some embodiments, control characters, user attribute information and corresponding classification information may be defined (e.g., customizable) on a mailbox-by-mailbox basis (e.g., within an email client). For example, certain combinations of control characters, user attribute information, and/or other information may correspond to certain classification information in the context of a first mailbox (e.g., a user's enterprise mailbox). And, the same combination of control characters, user attribute information, and/or other information may correspond to other classification information in the context of a second mailbox (e.g., a user's personal email mailbox).

In some embodiments, a classification data structure may include one or more policies and/or rules. A classification policy and/or rule may, for example, specify that certain types of classification information be added to a content object based on the sender, recipient, destination, time, originating mobile application, location of mobile device (e.g., upon sending), and/or other parameters associated with the content object transfer. For example, a classification policy may specify that all content objects received from a mobile application be modified to include default classification information (e.g., "Confidential"). In the event a user of a mobile application omits (e.g., forget) to add control characters to a content object, a default classification type may be defined to account for this case. In some embodiments, if an end user (e.g., an email client user) does not include a control character to indicate explicitly a classification for a communication (e.g., an email content object), the intermediate node may apply a default classification. Classification-related text and/or add classification metadata associated with the default classification may be added to the email content object.

At 630, classification information may be determined based on the identified control characters. In various embodiments, an intermediate node may determine classification information based on control characters identified in the content object. For example, a combination of control characters (e.g., "%ts%") may correspond to certain classification-related text (e.g., "Top Secret"), classification metadata (e.g., a "Top Secret" tag, label, etc.), and/or other classification information.

At 640, the content object may be modified to include the classification information. In some embodiments, control characters associated with a content object may be removed, and classification information may be added to the content object, attached to the content object, and/or otherwise associated with the content object as discussed herein. For example, the classification information may include classification-related text, classification metadata, and/or any other type of classification information associated with a content object as discussed herein.

The techniques disclosed herein provide automatic insertion of classification information into content objects originating from a mobile device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
receiving, at an intermediate node, a content object sent from a mobile application to a destination;
processing the content object to identify one or more control characters included in the content object; and
modifying the content object to replace the identified control characters with classification information.

2. The method of claim 1, wherein processing the content object includes:
parsing content included in the content object; and
identifying the control characters in the parsed content.

3. The method of claim 1, further comprising determining the classification information is based at least in part on the identified control characters.

4. The method of claim 3, wherein determining the classification information includes determining the classification information based at least in part on the identified control characters and one or more attributes associated with a user of the content object.

5. The method of claim 4, wherein the attributes associated with the user include one or more of a language associated with the user, a mobile device from which the content object was sent, and an application from which the content object was sent.

6. The method of claim 3, wherein attributes associated with the user include a language associated with a recipient user of the content object.

7. The method of claim 1, wherein modifying the content object includes:
    removing at least a portion of the control characters included in the content object; and
    inserting classification-related text into the content object.

8. The method of claim 1, wherein modifying the content object includes:
    determining classification information including classification metadata associated with the identified control characters; and
    modifying the content object to include the classification metadata.

9. The method of claim 8, wherein modifying the content object to include the classification metadata includes adding the classification metadata to a header associated with an email content object.

10. The method of claim 1, wherein the content object includes one or more of an email, an email attachment, a document, a spreadsheet, a webpage, an image, a file, and a folder.

11. The method of claim 1, wherein the classification information includes one or more of classification-related text, classification metadata, and one or more classification tags.

12. The method of claim 1, wherein the control characters include one or more of a sequence of characters, a string, a portion of a body of an electronic document, a portion of a header associated with an email, characters included in text associated with the content object, non-English characters, symbols, and an absence of characters.

13. The method of claim 1, further comprising providing the modified content object to the destination.

14. The method of claim 1, further comprising:
    receiving content object at the destination; and
    processing the content object based at least in part on the classification information.

15. The method of claim 1, wherein the destination includes one or more of a server, an enterprise server, an email server, document repository, and a network node.

16. The method of claim 1, wherein the intermediate node includes one or more of a classification application, a reverse proxy server, a gateway server, and a security enforcement node.

17. The method of claim 1, wherein the receiving step comprises:
    receiving the content object at the intermediate node comprising a classification application, wherein the content object is provided to the classification application at least in part in response to a command associated with the mobile application.

18. The method of claim 17, further comprising:
    outputting a prompt for classification information, the prompt generated based at least in part on the identified control characters; and
    receiving the classification information.

19. The method of claim 17, further comprising:
    providing the modified content object to the mobile application, wherein the mobile application sends the modified content object to the destination.

20. A system, comprising:
    a processor; and
    a memory coupled with the processor, wherein the memory is configured to provide the processor with instructions which when executed cause the processor to:
        receive, at an intermediate node, a content object sent from a mobile application to a destination;
        process the content object to identify one or more control characters included in the content object; and
        modify the content object to replace the identified control characters with classification information.

21. The system of claim 20, wherein the intermediate node includes one or more of a classification application, a reverse proxy server, a gateway server, and a security enforcement node.

22. The system of claim 20, wherein the processor is configured to process the content object at least in part by:
    parsing content included in the content object; and
    identifying the control characters in the parsed content.

23. The system of claim 20, wherein the processor is configured to modify the content object at least in part by:
    removing at least a portion of the control characters included in the content object; and
    inserting classification-related text into the content object.

24. A computer program product, the computer program product being embodied in a tangible non-transitory computer readable storage medium and comprising computer instructions for:
    receiving, at an intermediate node, a content object sent from a mobile application to a destination;
    processing the content object to identify one or more control characters included in the content object; and
    modifying the content object to replace the identified control characters with classification information.

25. The computer program product recited in claim 24, wherein processing the content object includes:
    parsing content included in the content object; and
    identifying the control characters in the parsed content.

26. The computer program product recited in claim 24, wherein modifying the content object includes:
    removing at least a portion of the control characters included in the content object; and
    inserting classification-related text into the content object.

27. The computer program product recited in claim 24, wherein modifying the content object includes:
    determining classification information including classification metadata associated with the identified control characters; and
    modifying the content object to include the classification metadata.

* * * * *

UNITED STATES PATENT AND TRADEMARK OFFICE
CERTIFICATE OF CORRECTION

PATENT NO.          : 8,813,242 B1
APPLICATION NO.     : 14/189773
DATED               : August 19, 2014
INVENTOR(S)         : Sean Michael Ginevan Page 1 of 1

It is certified that error appears in the above-identified patent and that said Letters Patent is hereby corrected as shown below:

In the Claims

In Column 10, Claim 3, Line 53, delete "is" after "information".

Signed and Sealed this
Fifth Day of July, 2016

Michelle K. Lee
*Director of the United States Patent and Trademark Office*